(12) United States Patent
Yenn

(10) Patent No.: US 12,463,691 B2
(45) Date of Patent: Nov. 4, 2025

(54) RADIO FREQUENCY ANTENNA AGGREGATOR SYSTEM FOR ENHANCED CHANNEL CAPACITY AND BEAMFORMING

(71) Applicant: APOGEE APPLIED RESEARCH, INC., Dayton, OH (US)

(72) Inventor: Matthew Campbell Yenn, Washington Township, OH (US)

(73) Assignee: APOGEE APPLIED RESEARCH, INC., Dayton, OH (US)

( * ) Notice: Subject to any disclaimer, the term of this patent is extended or adjusted under 35 U.S.C. 154(b) by 59 days.

(21) Appl. No.: 18/418,850

(22) Filed: Jan. 22, 2024

(65) Prior Publication Data
US 2024/0250726 A1     Jul. 25, 2024

Related U.S. Application Data

(60) Provisional application No. 63/480,781, filed on Jan. 20, 2023.

(51) Int. Cl.
*H04B 7/06* (2006.01)
*H04B 7/024* (2017.01)

(52) U.S. Cl.
CPC ........... *H04B 7/0613* (2013.01); *H04B 7/024* (2013.01)

(58) Field of Classification Search
CPC .............................. H04B 7/0613; H04B 7/024
See application file for complete search history.

(56) References Cited

U.S. PATENT DOCUMENTS

| | | | |
|---|---|---|---|
| 10,951,445 B2 * | 3/2021 | Sung | H04B 1/403 |
| 2010/0322219 A1 * | 12/2010 | Fischer | H04L 1/0071 370/344 |
| 2022/0029690 A1 * | 1/2022 | Alavi | H01Q 3/34 |
| 2023/0093843 A1 * | 3/2023 | Wu | H04L 5/0098 370/329 |

* cited by examiner

*Primary Examiner* — Dac V Ha
(74) *Attorney, Agent, or Firm* — Jacob M. Ward; Ward Law Office LLC

(57) ABSTRACT

The present disclosure relates to a radio frequency (RF) antenna aggregator system and method designed to enhance the efficiency and performance of signal transmission and reception in arrayed antennas. The system may comprise a digital processor, an analog processor, and a converter that work in concert to manipulate RF signals for various applications, including beamforming and Multiple Input Multiple Output (MIMO) operations. The digital processor may be adept at separating and combining RF signals using frequency division multiplexing, while the analog processor may perform similar functions in the analog domain. The converter may facilitate a transition between digital and analog signals, ensuring seamless signal processing. This innovative approach allows for the reduction of hardware costs and power consumption while maintaining high performance, supporting multiple beams, and enabling software-defined radio capabilities. The disclosure may be particularly beneficial for large antenna arrays, offering a low-power, cost-effective solution for complex RF signal management.

18 Claims, 7 Drawing Sheets

RADIO FREQUENCY ANTENNA AGGREGATOR SYSTEM FOR ENHANCED CHANNEL CAPACITY AND BEAMFORMING

CROSS-REFERENCE TO RELATED APPLICATIONS

This application claims the benefit of U.S. Provisional Application No. 63/480,781 filed on Jan. 20, 2023. The entire disclosure of the above application is incorporated herein by reference.

FIELD

The present technology relates to radio frequency (RF) transceiver systems and, more specifically, to an RF antenna aggregator system that enhances channel capacity and beamforming capabilities.

INTRODUCTION

This section provides background information related to the present disclosure which is not necessarily prior art.

The field of RF communication has seen significant advancement over the years, particularly in the development of arrayed antenna systems that may perform beamforming or Multiple Input Multiple Output (MIMO) operations. These systems may be important in various applications, including telecommunications and radar, where the ability to direct and shape RF energy may be paramount. The architecture of these systems has traditionally been divided into two main approaches: analog and digital.

There are certain differences between analog systems and digital systems. In an analog array system, signal alignment between each antenna may be performed, and then combined before the signal is digitized. This approach may typically require fewer digitizers, as the antenna signals are adjusted and combined prior to digitization. However, a limitation of analog systems is that they can only process one beam at a time. On the other hand, digital systems digitize the signals from each antenna and then perform the alignment digitally within a processor. While this fully digital architecture may allow for the processing of multiple beams simultaneously, it employs one digitizer per antenna.

One of the primary cost drivers in an arrayed antenna system may be the digitizer component. The analog architecture, with its reduced number of digitizers, may offer some cost savings but at the expense of flexibility, precision, and the ability to process multiple beams. The digital architecture, while more flexible, may significantly increase costs due to the requirement of having a digitizer for each antenna. This may present a challenge in designing systems to support the increasing demand for higher instantaneous bandwidths, higher operating frequencies, and better noise performance without incurring prohibitive costs.

The limitations of the current RF spectrum allocation may further exacerbate the problem. Transceivers may be unable to utilize the entire wideband RF spectrum due to administrative allocation of the RF spectrum. As a result, there is a push towards developing technologies that utilize the spatial domain to increase RF channel capacity through techniques such as MIMO, beamforming, and null steering. The number of independent data links available in a transceiver may be limited by the number of channels and the number of antennas, with the shape quality of the beams also being related to the number of apertures. Both factors indicate that more channels and more antennas may be beneficial.

Accordingly, there is a continuing need for an RF antenna aggregator system and method that increases the number of channels and related antennas while remaining power and cost efficient. Desirably, the system and method provides an innovative solution that bridges the gap between analog and digital architectures, offering the benefits of both without their respective drawbacks.

SUMMARY

In concordance with the instant disclosure, an RF antenna aggregator system and method that increases the number of channels and antennas, while remaining power and cost efficient, and which provides an innovative solution that bridges the gap between analog and digital architectures, offering the benefits of both without their respective drawbacks, has surprisingly been discovered.

The present technology may include articles of manufacture, systems, and processes that relate to an innovative RF antenna aggregator system designed to enhance channel capacity and beamforming capabilities in RF transceiver systems. This technology may combine the advantageous elements of both analog and digital architectures, allowing for the aggregation of signals from multiple antennas with analog preprocessing to maintain signal individuality. This may be followed by the use of a single digitizer for signal capture and sophisticated digital signal processing to separate the signals post-digitization. The system may be versatile, supporting both receiving and transmitting designs, and may be engineered to reduce overall costs and power consumption while simultaneously maintaining high performance. It may be particularly adept at supporting multiple data links and enabling software definable MIMO radio capabilities, making it a highly beneficial advancement in the field of RF communications.

In certain embodiments, a RF antenna aggregator system may comprise an analog processor configured to separate a singular first RF signal into a plurality of first RF signals, and combine a plurality of second RF signals into a singular second RF signal using frequency division multiplexing, a digital processor configured to separate the singular second RF signal into the plurality of second RF signals, and combine the plurality of first RF signals into a singular first RF signal using frequency division multiplexing, and a converter in communication with the analog processor and the digital processor, the converter configured to convert the singular first RF signal and the singular second RF signal between digital and analog.

In another embodiment, a RF antenna aggregator system may comprise a digital processor configured to combine a plurality of first RF signals into a singular first RF signal, an analog processor configured to separate a singular first RF signal into a plurality of first RF signals, and a converter in communication with the digital processor and the analog processor, the converter configured to convert the singular first RF signal from digital to analog.

In a further embodiment, A RF antenna aggregator system may comprise a digital processor configured to separate a singular second RF signal into a plurality of second RF signals, an analog processor configured to combine a plurality of second RF signals into a singular second RF signal, and a converter in communication with the digital processor and the analog processor, the converter configured to convert the singular second RF signal from analog to digital.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
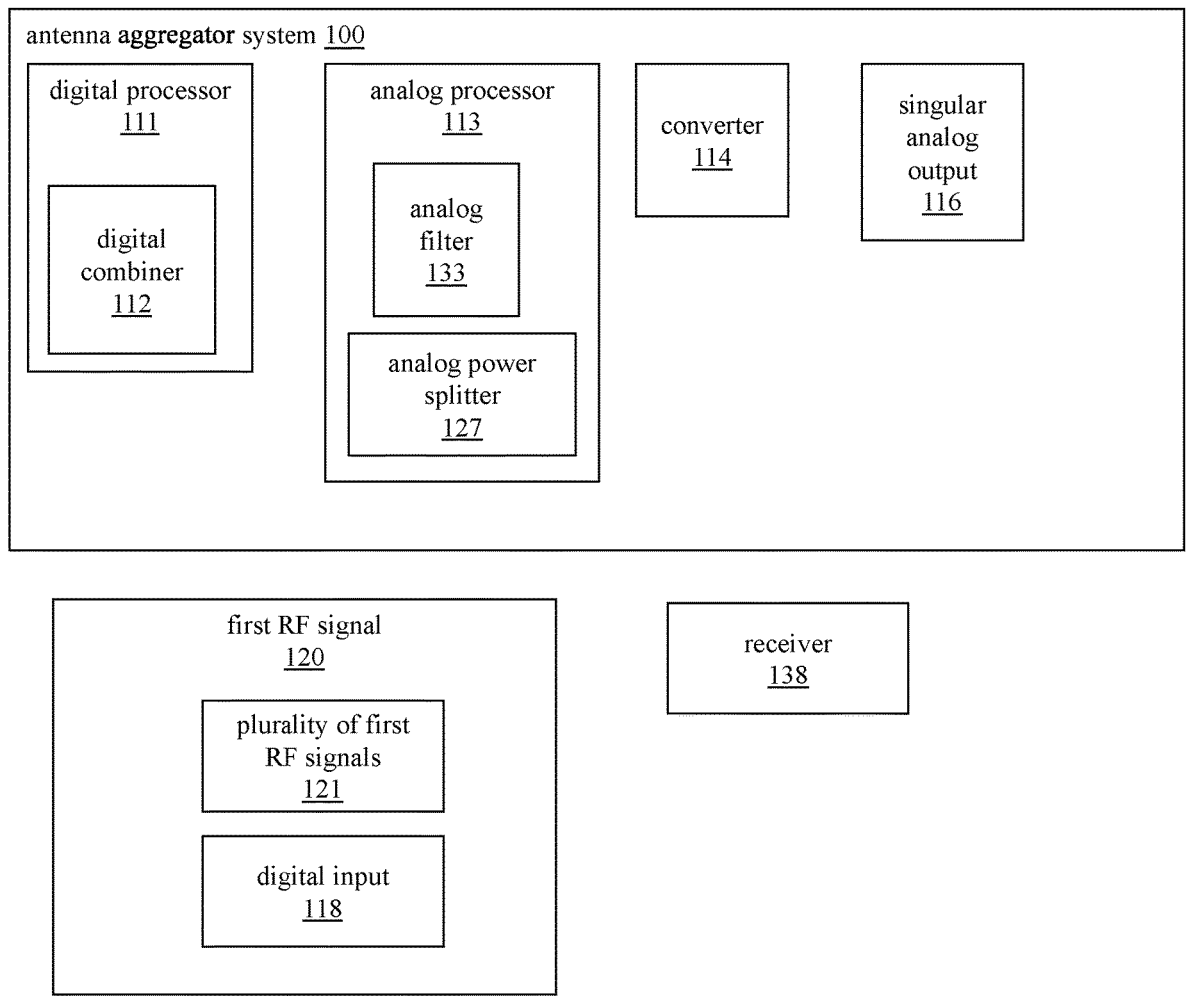
FIG. 1 is a block diagram illustrating an embodiment of an antenna aggregator system, in accordance with the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. In the present application, the terms first and second do not specify a particular order, unless specifically denoted otherwise.

The present technology relates to ways for implementing an analog combiner device and, in the inverse, an analog divider. RF chains may be combined into a larger group of channels and may be digitized by a converter. Beam phased shifting may be done digitally to support complex and higher performance implementations.

Embodiments may include both first and second signal paths and associated processing, only first signal paths and associated processing, and only second signal paths and associated processing.

FIGS. 1-5 illustrate various aspects of a RF antenna aggregator system 100 constructed in accordance with the present disclosure. FIG. 1 is a block diagram that describes the RF antenna aggregator system 100. The RF antenna aggregator system 100 may receive a plurality of first RF signals 121 in digital form. A digital processor 111 may be configured to combine the plurality of first RF signals 121 to form a singular first RF signal 120. The antenna aggregator system 100 may also convert the singular first RF signal 120 from digital to analog with a converter 114. In certain embodiments, the analog processor 113 may split the singular first RF signal 120 into the plurality of first RF signals 121 to form the plurality of first RF signals 121 in analog form.

In still certain embodiments, the RF antenna aggregator system 100 may receive a plurality of second RF signals 123 in analog form and combine the plurality of second RF signals 123 with the analog processor 113 into a singular second RF signal 122 using frequency division multiplexing. The singular second RF signal 122 may be converted from analog to digital with the converter 114. The RF antenna aggregator system 100 may also include the digital processor 113 configured to split the singular second RF signal 122 into the plurality of second RF signals 123 with the digital processor 111 to form the plurality of second RF signals 123 in digital form.

The RF antenna aggregator system 100 may also include a converter 114 in communication with the digital processor 111 and the analog processor 113. The converter 114 may be configured to convert the singular first RF signal 120, the singular second RF signal 122 between digital and analog. The RF antenna aggregator system 100 may have a plurality of singular analog outputs 116 with individual bands.

In certain embodiments, the digital processor 111 may include a digital combiner 112. The digital combiner 112 may be configured to combine the plurality of first RF signals 121. The converter 114 may be configured to convert the singular first RF signal 120, the plurality of first RF signals 121, the singular second RF signal 122, and the plurality of second RF signals 123 from digital to analog. The analog processor 113 may output the plurality of first RF signals 121 in analog to a receiver 138. In certain embodiments, the receiver 138 may include an amplifier, an antenna, and a switch. The analog processor 113 may include an analog power splitter 127 configured to separate the singular first RF signal 120. The plurality of first RF signals 121 may include a digital input 118 with individual signal bands separated.

In further embodiments, the singular second RF signal 122 may include radar, cell, and radio signals. Additionally, the RF antenna aggregator system 100 may include digital filters and/or analog filters 133. In certain embodiments, the RF antenna aggregator system 100 may also include an oscillator generator 130 (FIGS. 4-5) configured to produce a continuous, repeated, alternating waveform. In particular, the RF antenna aggregator system 100 may process one or more inputs and signal bands 140 with individual desired signal bands 140 in analog and digital, for example, such as possible from antennas and block converters. This may also include analog outputs with individual desired signal bands 140, for example, such as possible to one or more amplifiers, antennas, and/or switches, etc.

Figure 2:
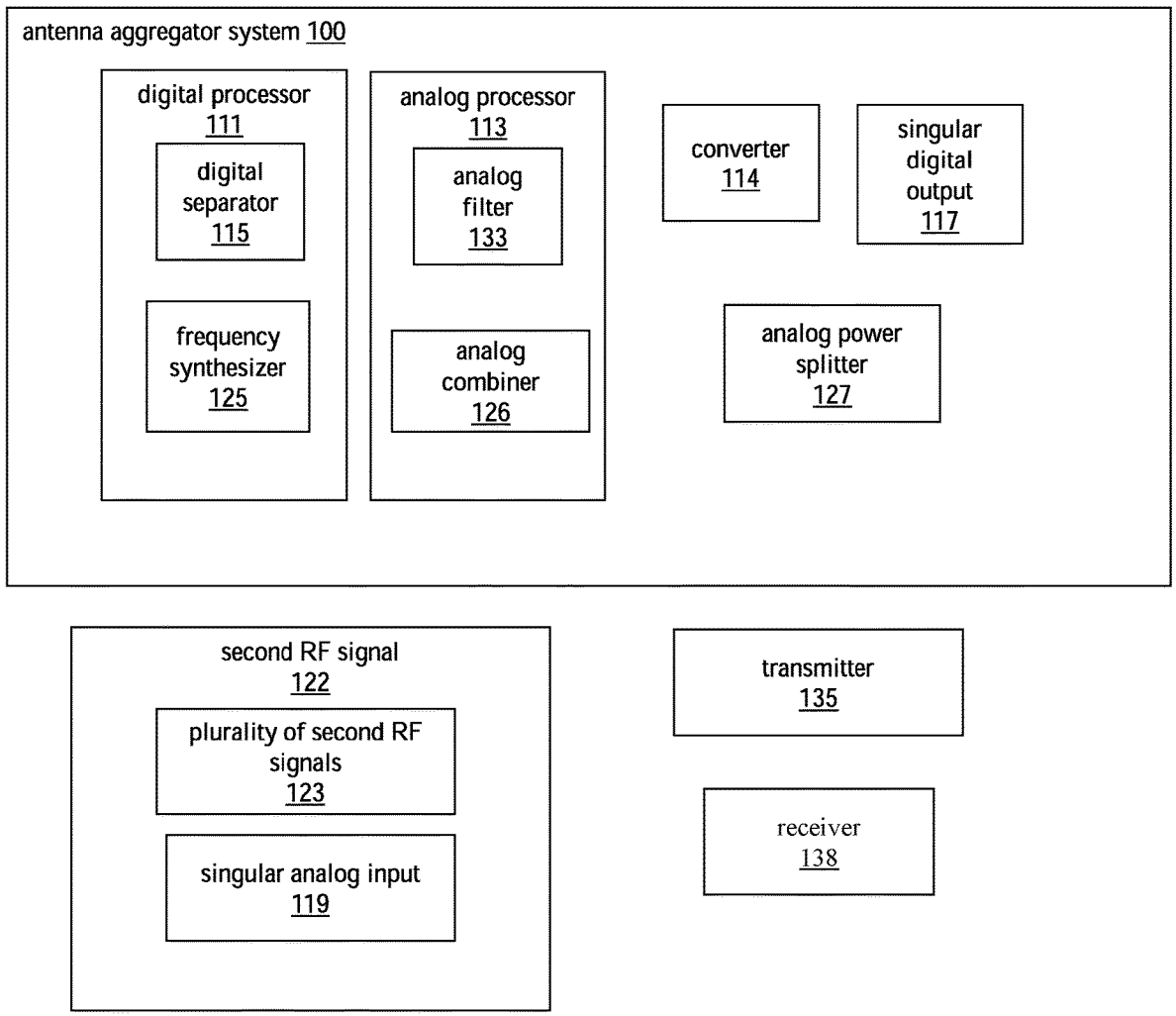
FIG. 2 is a block diagram illustrating another embodiment of an antenna aggregator system, in accordance with the present disclosure.

FIG. 2 is a block diagram that describes an RF antenna aggregator system 100, according to some embodiments of the present disclosure. The RF antenna aggregator system 100 may include a digital processor 111 configured separate a singular first RF signal 120 into a plurality of first RF signals 121 and combine a plurality of second RF signals 123 into a singular second RF signal 122. The RF antenna aggregator system 100 may also include an analog processor 113 configured to separate the singular first RF signal 120 into the plurality of first RF signals 121 and combine the plurality of second RF signals 123 into the singular second RF signal 122. The RF antenna aggregator system 100 may also include a converter 114 in communication with the digital processor 111 and the analog processor 113, the converter 114 configured to convert the singular first RF signal 120, the singular second RF signal 122 between digital and analog. The RF antenna aggregator system 100 may include a plurality of singular digital output 117 with individual bands.

With continued reference to FIG. 2, the digital processor 111 may include a digital separator 115 configured to separate the plurality of second RF signals 123. The analog processor 113 may receive the plurality of second RF signals 123 in analog from a transmitter 135 which may include one of an antenna and a block converter. The analog processor 113 may include an analog combiner 126 configured to combine the plurality of second RF signals 123.

Additionally, the converter 114 may be configured to convert the singular first RF signal 120, the plurality of first RF signals 121, the singular second RF signal 122, and the plurality of second RF signals 123 from analog to digital. The digital processor 111 may output the plurality of second RF signals 123 in digital to the receiver 138. The receiver 138 may include one of an amplifier, an antenna, and a switch. The plurality of second RF signals 123 may include a singular analog input 119 with individual signal bands.

The present technology may provide an RF antenna aggregator system 100 configured to enhance the capabilities of RF transmission and reception through advanced signal processing techniques. The RF antenna aggregator system 100 may include a digital processor 111, an analog processor 113, and a converter 114, such that each of the digital processor 111, the analog processor 113, and the converter 114 may manage RF signals. In certain embodiments, these components may be integral to the operation of the RF antenna aggregator system 100 and provide a versatile platform for various RF applications.

The digital processor 111 may be a central component of the RF antenna aggregator system 100, configured to perform operations on RF signals. For example, it may separate a singular first RF signal 120 into a plurality of first RF signals 121 and combine a plurality of second RF signals 123 into a singular second RF signal 122 using frequency division multiplexing. This functionality may be illustrated where the digital processor 111 may be shown to interact with both a first RF signal 120 and a second RF signal 122, enabling applications such as dynamic spectrum access and frequency hopping.

The analog processor 113 may work in tandem with the digital processor 111 to manage RF signals in an analog form and be capable of separating the singular first RF signal 120 into the plurality of first RF signals 121 and combining the plurality of second RF signals 123 into the singular second RF signal 122, also utilizing frequency division multiplexing. The analog processor 113 may manage RF signals for applications such as beamforming and spatial multiplexing in advanced communication systems.

A converter 114 may serve as a bridge between the digital and analog realms. For example, the converter 114 may be in communication with the digital processor 111 and the analog processor 113 and may be configured to convert the singular first RF signal 120, the plurality of first RF signals 121, the singular second RF signal 122, and the plurality of second RF signals 123 between digital and analog forms. The converter 114 may be used in the signal conversion process as shown in FIG. 1 and FIG. 2, enabling the RF antenna aggregator system 100 to support a wide range of signal bandwidths and frequencies, which may be useful for modern communication standards.

In certain embodiments, the plurality of first RF signals 121 includes a digital input 118 with individual signal bands separated. Such a configuration may be beneficial for applications that require selective signal processing, such as filtering unwanted frequencies or isolating specific channels for secure communications.

The digital processor 111 may include a digital combiner 112 configured to combine the plurality of first RF signals 121. The digital combiner 112 may be used in the signal combination process, where it may play a role in the digital processing of RF signals. The ability to combine signals digitally may be particularly useful in scenarios where multiple data streams need to be aggregated, such as in data uplink scenarios from remote sensors to a central hub.

In further embodiments, the converter 114 may be adept at handling signals and may be configured to convert a signal from wideband digital to analog. This conversion capability may be crucial where the converter 114 may be a central element in the signal processing chain. Wideband conversion may be important in applications such as radar systems, where a broad frequency range may be necessary for detecting objects at various distances and speeds. Additionally, in certain embodiments the conversion process of the singular second RF signal 122 from analog to digital may utilize a wideband analog-to-digital conversion process, where the converter 114 may perform this function. Wideband analog-to-digital conversion may be important in applications that require high-fidelity signal representation, such as in wideband communication systems where a broad frequency range needs to be captured.

The analog processor 113 may be designed to output the plurality of first RF signals 121 in analog to a receiver 138. This functionality may be used in the transmission of RF signals, where the analog processor 113 may interface with the receiver 138. This step may be particularly important in communication systems where analog signals are required for the final transmission stage, such as in broadcasting or satellite communication.

In certain embodiments, the plurality of first RF signals 121 in analog form may include a singular analog output 116 with individual bands. This singular analog output 116 may be used in analog signal processing, where it may facilitate an output of RF signals. The provision of individual bands in the output may allow for flexibility in signal routing and distribution, which may be used in complex systems with multiple endpoints, such as distributed antenna systems (DAS).

The receiver 138 to which the analog processor 113 may output the signals may include one or more of an amplifier, an antenna, and a switch. This allows for versatility in the output options, where the receiver 138 may take various forms depending on the application. For instance, in a wireless communication setup, the receiver 138 may include an antenna that transmits the processed signals to end-user devices.

In yet certain embodiments, the analog processor 113 may be coupled to an analog power splitter 127 configured to copy the singular first RF signal 120 to the plurality of first RF signals 121. This analog power splitter 127 may be used for signal distribution, where it may enable the splitting of RF signals. Such a feature may be used in applications that require a same signal to be sent to one or more receivers 138, for example, in a broadcast system or a multi-target tracking radar.

The plurality of second RF signals 123 may include a singular analog input 119 with individual signal bands. This singular analog input 119 may allow for a reception of analog signals with distinct bands, where it may operate as an interface for the analog processor 113. This capability may be particularly useful in a system that needs to process signals from different sources and frequencies, such as in a multi-band receiver.

In certain embodiments, the analog processor 113 may also include an analog combiner 126 configured to combine the plurality of second RF signals 123. This analog combiner 126 may be an important element for signal aggregation, as supported by the system architecture. The ability to combine signals in the analog domain may be beneficial in applications such as phased array radar systems, where multiple antenna elements need to be coherently combined for effective steering of RF beams.

In particular embodiments, the converter 114 capabilities may extend to converting signals from analog to digital. This conversion may include a step in the signal processing flow, where the converter 114 may perform this function. The conversion from analog to digital may be a fundamental process in digital communication systems, where signals need to be digitized for further processing, storage, or transmission over digital networks.

The digital processor 111 may further include a digital separator 115 configured to separate the plurality of second RF signals 123. This digital separator 115 may be important for the separation of combined signals, where it may be a part of the digital processing. The separation of signals may be important in receiver systems that need to demultiplex and process individual channels from a composite signal, such as in a multi-channel receiver.

The digital processor 111 may also be capable of outputting the plurality of second RF signals 123 in digital to a receiver 138. This output capability may be used for digital signal processing, where the digital processor 111 interfaces with the receiver 138. The digital output may be used in systems where the processed signals need to be further analyzed or transmitted over a digital medium, such as in a digital backhaul network.

The plurality of second RF signals 123 in digital may include a singular digital output 117 with individual bands. This singular digital output 117 may be an important feature where it enables the transmission of digital RF signals. The provision of individual bands in the digital output may allow for targeted signal processing and routing, which may be beneficial in systems that require selective signal handling, such as in a multi-service communication platform.

The RF antenna aggregator system 100 may further include a digital filter and an analog filter 133 to enhance signal quality. These filters may be important for signal purification and, where they are incorporated into the system design. Filtering may be a step in ensuring signal integrity and reducing interference, which may be important in environments with high levels of noise or in applications that require high signal-to-noise ratios, such as in precision measurement systems.

Figure 4:
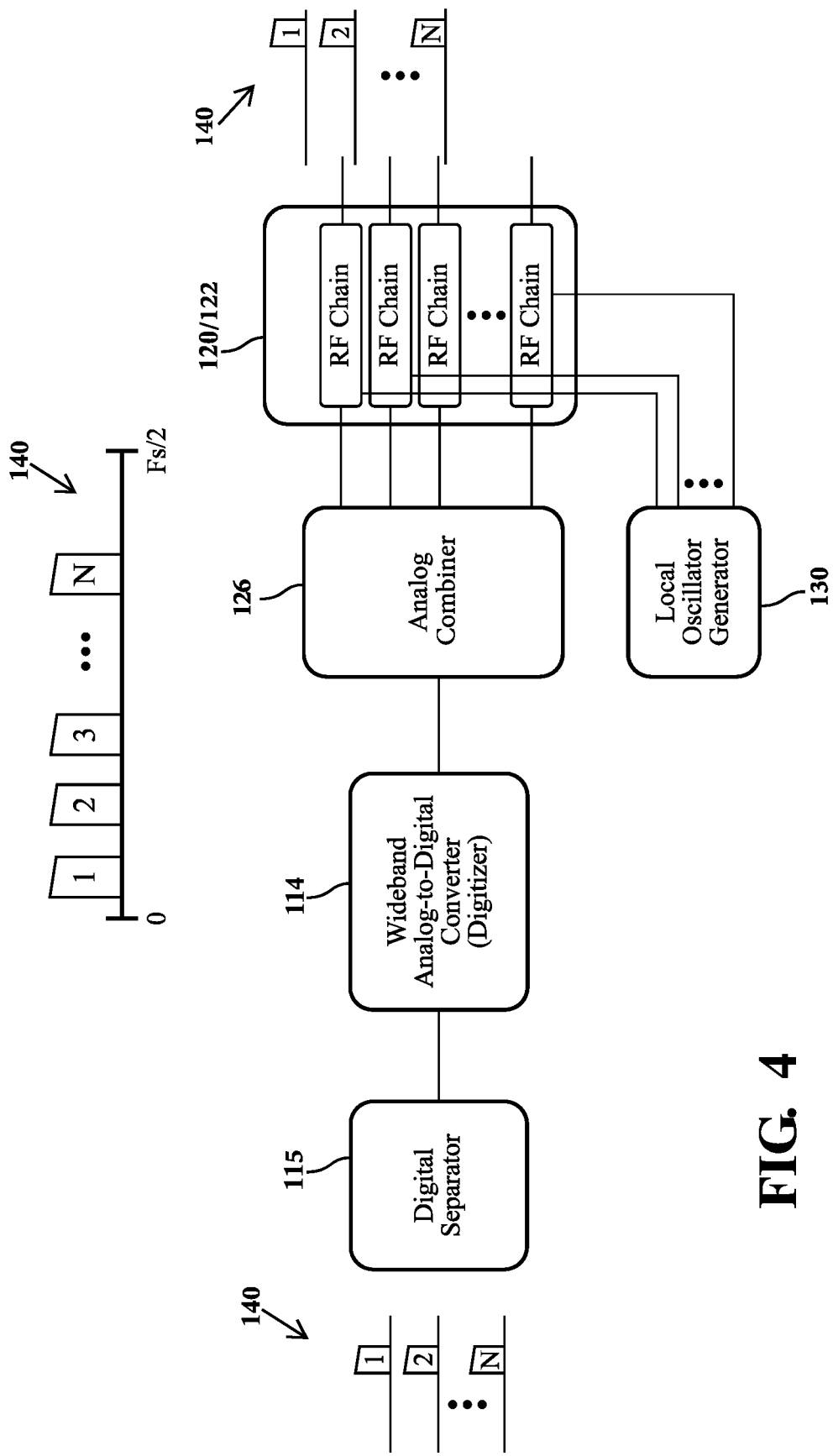
FIG. 4 is a receiver schematic diagram of an embodiment of an antenna aggregator system, detailing the signal processing and conversion stages, in accordance with the present disclosure.
Figure 5:
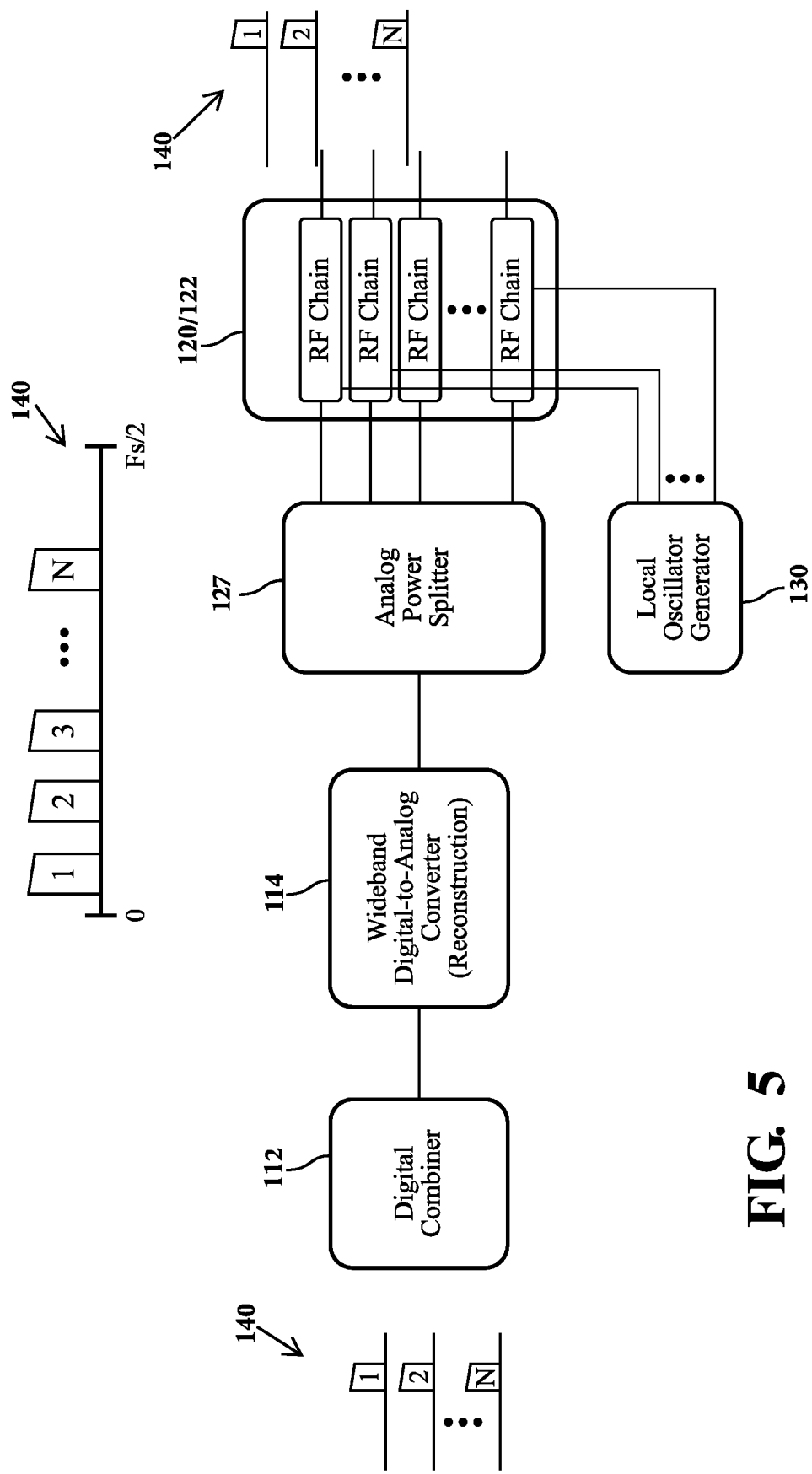
FIG. 5 is a transmitter schematic diagram of an embodiment of an antenna aggregator system, outlining the steps for preparing signals for transmission, in accordance with the present disclosure.

An oscillator generator 130, as shown in FIGS. 4 and 5, may be configured to produce a continuous, repeated, alternating waveform. The oscillator generator 130 may be important for signal generation, where it may provide the predetermined waveforms for the system. The oscillator generator 130 may be used in applications that require stable and precise frequency sources, such as in synchronization systems or frequency reference modules.

Figure 6:
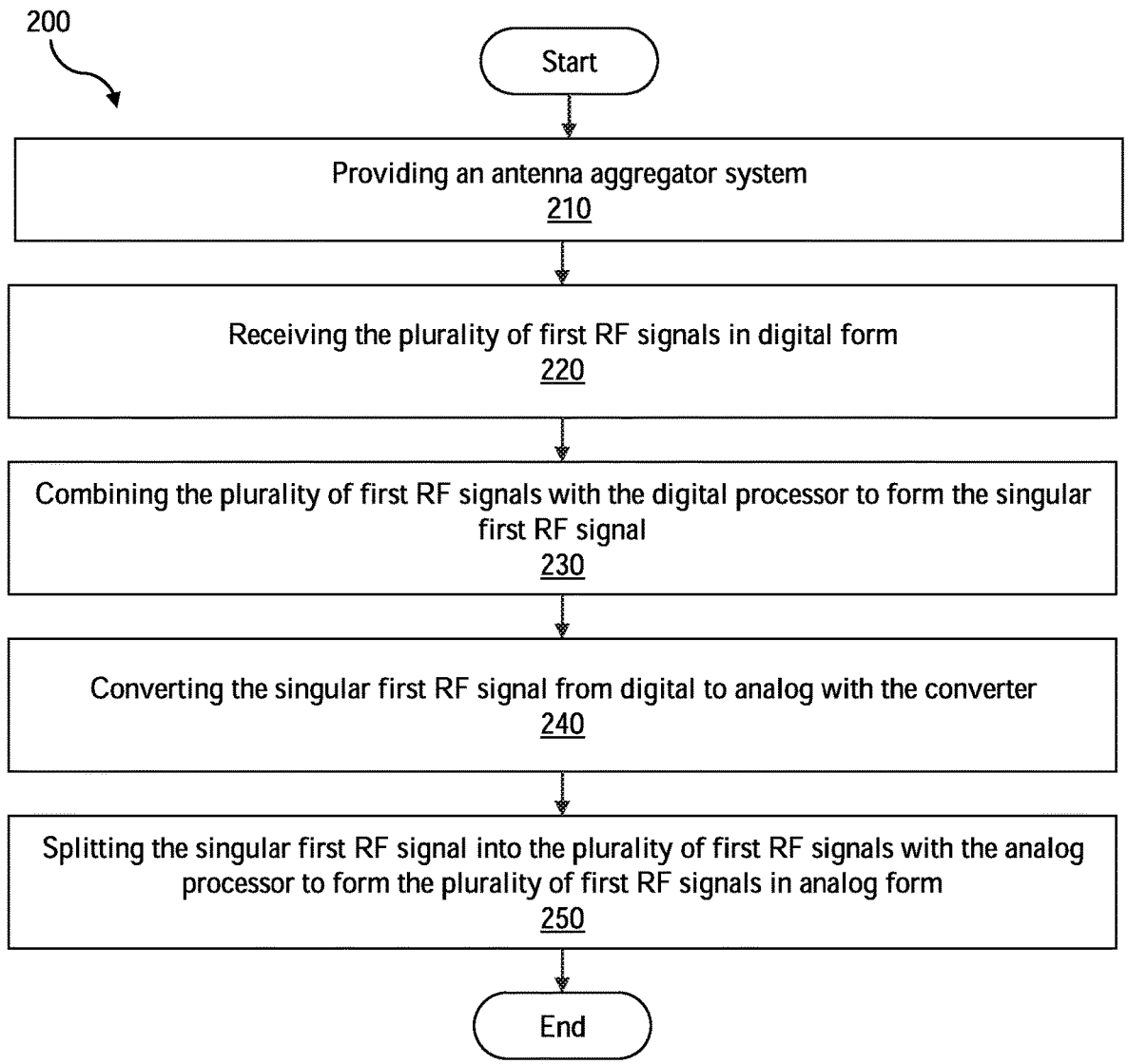
FIG. 6 is a flowchart illustrating a method for transmitting signals using an antenna aggregator system, in accordance with present disclosure.

FIG. 6 is a flowchart that describes a method 200 for transmitting signals, according to an embodiment of the present disclosure. In a first step 210, an RF antenna aggregator system 100 as described herein may be provided. In a second step 220, the plurality of first RF signals 121 may be received in digital form. The plurality of first RF signals 121 may be combined to form a singular first RF signal 120 using the digital processor 111 in a third step 230. In a fourth step 240, the singular first RF signal 120 may be converted from digital to analog with the converter 114. The singular first RF signal 120 may be split into the plurality of first RF signals 121 using the analog processor 113 to form the plurality of first RF signals 121 in analog form in a last step 250.

In certain embodiments, additional steps may be further included in the method 200 shown in FIG. 6. For example, a plurality of second RF signals 123 may be received in analog form. The plurality of second RF signals 123 may be combined to form a singular second RF signal 122 using the analog processor 113. The singular second RF signal 122 may be converted from analog to digital using the converter 114. In certain embodiments, the singular second RF signal 122 may be split into the plurality of second RF signals 123 with the digital processor 111 to form the plurality of second RF signals 123 in digital form.

The method 200 and the RF antenna aggregator system 100 used thereby may also include the following aspects. The digital processor 111 may further include a digital filter configured to filter the plurality of first RF signals 121 before combining them into the singular first RF signal 120. In certain embodiments, the analog processor 113 may further include an analog filter 133. The analog filter 133 may be configured to filter the plurality of first RF signals 121 after converting the singular first RF signal 120 from digital to analog. The converter 114 may be further configured to perform conversion of the singular first RF signal 120 from digital to analog using a digital-to-analog conversion process. In certain embodiments, a step of splitting the singular first RF signal 120 into the plurality of first RF signals 121 with the analog processor 113 may include utilizing an analog power splitter 127. In particular, the analog processor 113 may include the analog power splitter 127. The analog power splitter 127 may be configured to split the singular first RF signal 120 into the plurality of first RF signals 121 while maintaining phase and amplitude characteristics of an original signal. The analog processor 113 may also be configured for adjusting the phase of the plurality of first RF signals 121 to facilitate beamforming applications. In certain embodiments, the analog processor 113 may further include a set of tunable filters for selectively filtering the plurality of first RF signals 121 based on predetermined frequency bands prior to conversion by the converter 114. In certain embodiments, the digital processor 111 may further be configured to perform channel equalization on the plurality of first RF signals 121 to compensate for channel-induced distortions after the signals are combined into the singular first RF signal 120. In particular, the digital processor 111 may be equipped with a beamforming algorithm capable of dynamically adjusting a beam pattern based on an intended direction of transmission or reception.

Figure 7:
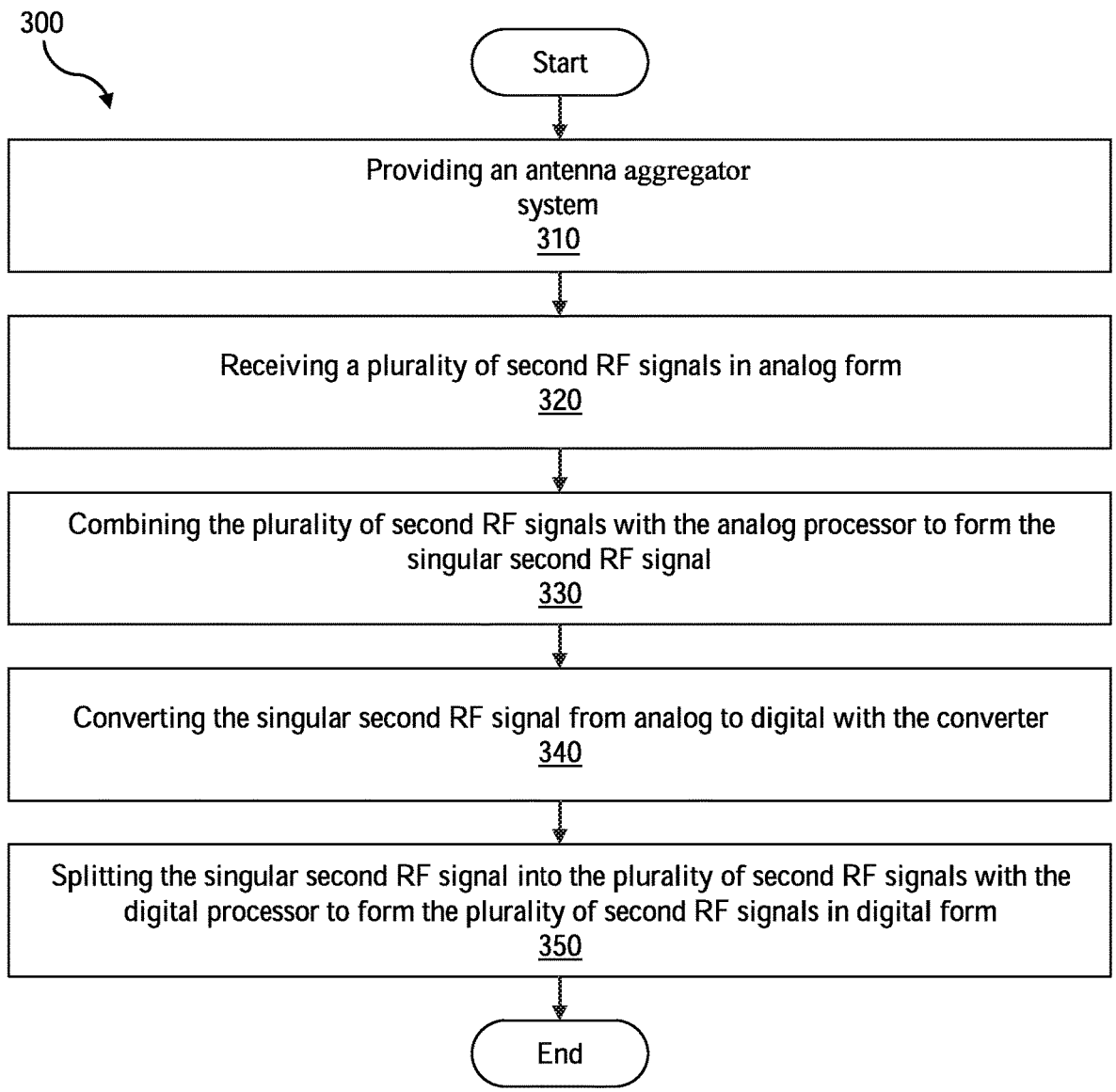
FIG. 7 is a flowchart illustrating a method for receiving signals with an antenna aggregator system, in accordance with present disclosure.

FIG. 7 is a flowchart that describes a method 300 for receiving signals, according to another embodiment of the present disclosure. In a first step 310, an RF antenna aggregator system 100 as described herein may be provided. In a second step 320, the plurality of second RF signals 123 may be received in analog form. The plurality of second RF signals 123 may be combined to form the singular second RF signal 122 using the analog processor 113 in a third step 330. In a fourth step 340, the singular second RF signal 122 may be converted from analog to digital with the converter 114. The singular second RF signal 122 may be split into the plurality of second RF signals 123 with the digital processor 111 to form the plurality of second RF signals 123 in digital form in a fifth step 350.

In certain embodiments, the plurality of first RF signals 121 may be received in digital form and the plurality of first RF signals 121 may be combined using the digital processor 111 to form the singular first RF signal 120. The singular first RF signal 120 may be converted from digital to analog with the converter 114. The singular first RF signal 120 may further be split into the plurality of first RF signals 121 using the analog processor 113 to form the plurality of first RF signals 121.

The method 300 and the RF antenna aggregator system 100 used thereby may also include the following aspects. The digital processor 111 may include a digital separator 115 configured to separate the singular second RF signal 122 into the plurality of second RF signals 123 after conversion from analog to digital. The analog processor 113 may further include an analog combiner 126 configured to combine the plurality of second RF signals 123 into the singular second RF signal 122 before conversion to digital. In certain embodiments, the converter 114 may be further configured to perform conversion of the singular second RF signal 122 from analog to digital using an analog-to-digital conversion process. In still certain embodiments, splitting the singular second RF signal 122 into the plurality of second RF signals 123 with the digital processor 111 may include utilizing a digital signal processing algorithm optimized for frequency division multiplexing.

The analog processor 113 may include the analog combiner 126 configured to combine the plurality of second RF signals 123 into the singular second RF signal 122 by summing the signals in a manner that preserves a signal-to-noise ratio. In particular, the analog processor 113 may be further configured to perform impedance matching for the plurality of second RF signals 123 to optimize power transfer to the converter 114. In certain embodiments, the digital processor 111 includes a frequency synthesizer 125 configured to generate a reference signal for frequency calibration of the plurality of second RF signals 123 during a digital combining process. In certain embodiments, transmitting signals may involve providing an RF antenna aggregator system 100 that may include the digital processor 111, the analog processor 113, and the converter 114.

In certain embodiments, the plurality of first RF signals 121 may be received in digital form. This reception may be an initial step in the signal processing sequence where the digital processor 111 may receive digital signals. The ability to receive digital signals may be beneficial in digital communication systems, where signals are often transmitted in a digital format for reasons such as improved signal robustness and ease of multiplexing. The digital processor 111 may combine the plurality of first RF signals 121 to form the singular first RF signal 120. This combination process may be an important where the digital processor 111 performs signal combination. Signal combination may be particularly useful in scenarios where bandwidth efficiency may be important, such as in bandwidth-limited communication channels or in systems that need to aggregate data from multiple sources.

The converter 114 may include the following aspects. For example, the converter 114 may convert the singular first RF signal 120 from digital to analog. This conversion may be important in the signal processing flow, where the converter 114 may perform the digital-to-analog conversion. The digital-to-analog conversion may be important in systems that interface with analog components or need to transmit signals over analog mediums, such as in legacy communication networks.

The analog processor 113 may further include the following aspects. The analog processor 113 may split the singular first RF signal 120 into the plurality of first RF signals 121 in analog form. This splitting may be an important function for the analog signal distribution, where the analog processor 113 includes executing this operation. The ability to split signals in the analog domain may be beneficial in systems that require the distribution of a common signal to multiple endpoints, such as in a public address system or a multi-zone audio distribution network.

In certain embodiments, the plurality of second RF signals 123 may be in analog form, where the analog processor 113 may be prepared to receive analog signals. The reception of analog signals may be important when operating with analog front-ends or in environments where the signal source may be inherently analog, such as in analog sensor networks.

The analog processor 113 may include the following aspects. The analog processor 113 may combine the plurality of second RF signals 123 to form the singular second RF signal 122. This combination may be important in certain embodiments, where the analog processor 113 performs the signal aggregation. The aggregation of analog signals may be used in applications that require the summation of multiple signals, such as in audio mixing consoles or in the combination of signals from an array of antennas.

In certain embodiments, the converter 114 may convert the singular second RF signal 122 from analog to digital. This conversion may be a step in a signal processing sequence, where the converter 114 may perform an analog-to-digital conversion. The analog-to-digital conversion may be important where digital signal processing offers advantages such as flexibility, scalability, and advanced signal manipulation capabilities.

The digital processor 111 may include the following aspects. The digital processor 111 may split the singular second RF signal 122 into the plurality of second RF signals 123 in digital form. This splitting may be an important function for the digital signal distribution, where the digital processor 111 may execute this operation. The digital separation of signals may be important in systems that need to demultiplex and individually process channels from a composite signal, such as in the case of a digital television receiver. The digital processor 111 may further include the digital separator 115 configured to separate the singular second RF signal 122 into the plurality of second RF signals 123 after conversion from analog to digital. This digital separator 115 may be an important component for the separation of combined signals, where may be part of the digital processing. The digital separation of signals enables the system to manage complex signal processing tasks, such as channel demultiplexing and individual channel equalization.

Figure 3:
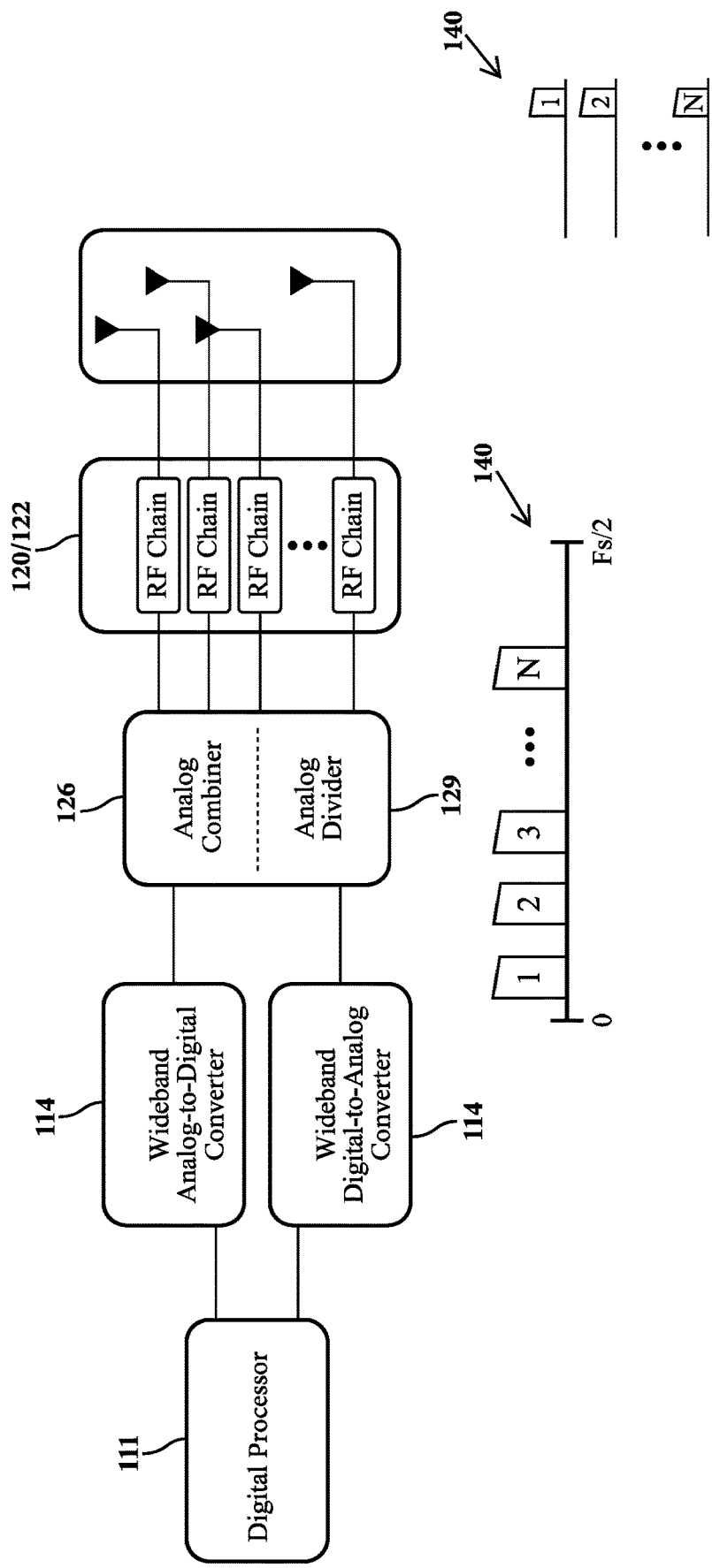
FIG. 3 is a schematic diagram of an embodiment of an antenna aggregator system, showing the digital and analog signal processing paths, in accordance with the present disclosure.

The analog processor 113 may include the following aspects. The analog processor 113 may further include an analog combiner 126 configured to combine the plurality of second RF signals 123 into the singular second RF signal 122 before conversion to digital. This analog combiner 126 may be an important element for signal aggregation. The analog combination of signals may be beneficial in applications that require the coherent summation of signals, such as in the formation of composite signals for broadcasting or in the coherent detection of signals in radar systems. In certain embodiments, the analog combiner 126 may interact in tandem with a converter 114 and an analog divider 129, such as shown in FIG. 3.

In addition, reception capability may be important for the operation of the RF antenna aggregator system 100 operation, where the analog processor 113 may receive analog signals. The ability to receive signals from various sources, such as antennas or block converters, may be important in systems that need to interface with different types of signal sources, such as in a multi-standard communication receiver.

In certain embodiments, splitting the singular second RF signal 122 into the plurality of second RF signals 123 with the digital processor 111 may include utilizing a digital signal processing algorithm optimized for frequency division multiplexing. The use of digital signal processing algorithms may allow advanced signal manipulation, such as channel filtering, error correction, and signal enhancement, which may ensure high-quality signal transmission and reception.

The analog processor 113 may include the following aspects. The analog processor 113 may comprise the analog combiner 126 configured to combine the plurality of second RF signals 123 into the singular second RF signal 122 by summing the signals in a manner that preserves a signal-to-noise ratio. The preservation of signal-to-noise ratio during the combination process may be particularly important in applications that require high signal integrity, such as in scientific instrumentation or in communication systems where signal clarity may be important. The analog processor 113 may be further configured to perform impedance matching for the plurality of second RF signals 123 to optimize power transfer to the converter 114. Impedance matching may be a fundamental aspect of RF engineering, ensuring that maximum power may be transferred between components, which may be important in minimizing signal loss and maximizing system performance.

The analog processor 113 may include the following aspects. For example, the digital processor 111 may comprise a frequency synthesizer 125 configured to generate a reference signal for frequency calibration of the plurality of second RF signals 123 during a digital combining process. Frequency synthesis may be important in applications that require precise frequency control, such as in communication systems where channel frequencies need to be accurately maintained.

The digital processor 111 may include the following aspects. For example, the digital processor 111 may include a modulation/demodulation module configured to modulate the plurality of second RF signals 123 for transmission or demodulate received signals for further digital processing. Modulation and demodulation are core processes in communication systems, enabling the encoding of information onto carrier signals for transmission and the retrieval of information from received signals.

In particular, the RF antenna aggregator system 100 and its associated methods may provide a comprehensive solution for managing RF signals in digital and analog forms, offering significant advantages in terms of cost, power efficiency, and performance over existing solutions. The system's flexibility and advanced capabilities make it suitable for a wide range of applications, including but not limited to phased arrays, MIMO systems, and multiple channel aggregators.

Advantageously, the RF antenna aggregator system 100 described herein offers a multitude of benefits and improvements over traditional RF transceiver systems. The present disclosure bridges the gap between analog and digital architectures, combining their benefits while mitigating their respective drawbacks. This innovative RF antenna aggregator system 100 enhances channel capacity and beamforming capabilities, which may be important for various applications such as telecommunications and radar systems.

One of the primary advantages of the RF antenna aggregator system 100 is its ability to process multiple beams simultaneously, which is a significant improvement over analog systems that are limited to one beam at a time. The digital processor 111 within the RF antenna aggregator system 100 may be capable of separating and combining RF signals using frequency division multiplexing, allowing for dynamic spectrum access and frequency hopping. The analog processor 113 may complement this by performing similar functions in the analog domain, which may be important for applications requiring analog signal processing.

The inclusion of a converter 114 that may transition between digital and analog signals ensures that the system can support a wide range of signal bandwidths and frequencies, which may be necessary for modern communication standards. This versatility may be further enhanced by the ability of the RF antenna aggregator system 100 ability to support both receiving and transmitting designs.

Cost and power efficiency are also significant advantages of the RF antenna aggregator system 100. By allowing for the aggregation of signals from multiple antennas with analog preprocessing and the use of a single digitizer for signal capture, the RF antenna aggregator system 100 reduces the number of digitizers required, which are typically one of the primary cost drivers in arrayed antenna systems. This design leads to a reduction in overall costs and power consumption without compromising performance.

Furthermore, the RF antenna aggregator system 100 is engineered to be versatile and adaptable, supporting multiple data links and enabling software-definable MIMO radio capabilities. This makes RF antenna aggregator system 100 a highly beneficial advancement in the field of RF communications, particularly adept at supporting the increasing demand for higher instantaneous bandwidths, higher operating frequencies, and better noise performance.

In sum, the RF antenna aggregator system 100 presents a cost-effective, power-efficient, and high-performance solution for advanced RF communication, offering significant advantages in terms of flexibility, scalability, and capability to meet the demands of contemporary and future RF applications.

EXAMPLES

Example embodiments of the present technology are provided with reference to the several figures enclosed herewith. Example embodiments are particularly described herein below.

Example 1: Phased Array Radar Systems

In certain embodiments, the RF antenna aggregator system 100 may be particularly advantageous in phased array radar systems, where the ability to manage multiple RF signals may be crucial for the accurate detection and tracking of objects. In such systems, the digital processor 111 may be used to combine signals from multiple radar elements into a singular RF signal using frequency division multiplexing. By processing the antenna element's channel information in a digital processor, more beams may be calculated simultaneously then with an analog beamforming processor. Supporting tracking of more targets. This capability may allow for a coherent processing of signals, which may be important for the formation of a focused radar beam that may be electronically steered to different directions without physically moving the antenna array.

Using a digital type processor such as an FPGA interfaced to the digital processor 111 to provide the beamforming calculations, finer resolutions of individual channel delays can be implemented. These finer resolutions may not be available in radar designs that use analog beamforming since integrated circuits may use delays with less resolution and accuracy. The combination of analog processor 113, converter 114, and digital processor 111 maintaining the phase and amplitude information for all antenna elements may increase the resolution, beam shape quality, quantity of beams, and quantity of targets tracked.

In certain embodiments, an analog processor 113, may play a significant role in an RF stage of a radar system. For example, it may function as an analog power combiner, combining the signals received from different radar elements into a singular RF signal that preserves the individual element's channel phase and amplitude information necessary for accurate beamforming. Separating the process may be used for a radar system to increase the quantity of antenna elements without significantly increasing cost or reducing capability to increase imaging resolution and precise target detection over a range of distances and angles.

The converter 114 may facilitate a transition between digital and analog signal processing within the radar system. For example, the converter 114 may convert a combined digital signal to analog form for transmission through the antenna array of the radar, as illustrated in FIG. 1. The combining of individual RF signals before conversion in both the transmission (first signals) and receive (second signals) directions reduces the number of converters required for a set number of antenna elements. Real digital processors are limited by how many converters are supported on an integrated circuit or are limited by the integrated circuits available connections, which in turn limits how many elements can be utilized per digital processor. This conversion may be necessary for the radar system's operation, as it allows for the transmission and reception of higher-fidelity RF signals that can interact with targets and return valuable information about their speed, distance, and other characteristics.

Example 2: Multi-Service Communication Platforms

In certain embodiments, such for example, multi-service communication platforms, the RF antenna aggregator system 100 may enable a simultaneous handling of various communication standards and frequencies. For example, the digital processor 111, and the digital combiner 112, may aggregate multiple data streams from different services, such as cellular, Wi-Fi, and satellite communications, into a single RF signal. This aggregation may be important for communication platforms that need to provide seamless connectivity across different network types and for users with diverse communication needs.

The analog processor 113 may be coupled to the analog power splitter 127 and may allow for a distribution of the aggregated signal to a transmitter 135 or receiver 138. This distribution may be crucial in environments such as airports and shopping centers, where a single communication platform may support a wide range of services and devices. The analog processor 113 may ensure each service receives an appropriate signal in the correct format. For example, where the signal may be for broadcasting a Wi-Fi signals to a passenger or providing a backhaul connectivity for a cellular base station.

The role of the converter 114 may be to convert a signal between a digital form and an analog form may be particularly important in multi-service platforms. It may allow for a digitization of incoming analog signals for processing and routing, as well as the conversion of a digital signal back to an analog signal for transmission. This dual functionality may ensure that the communication platform may interface legacy analog systems and modern digital networks, thus providing a bridge between different technological generations.

Example 3: Software-Defined Radio (SDR) Systems

In certain embodiments, software-defined radio (SDR) systems may further benefit from the RF antenna aggregator system 100 from its flexible signal processing capabilities. For example, the existing SDR's may only support single or low quantity antenna elements requiring multiple SDRs to create an array of antenna elements. The aggregator system 100 would increase the number of antenna elements per SDR unit reducing the cost and size of the overall system. When multiple SDR units are required to create an antenna array, extra circuits and equipment used to maintain timing coherency between SDR units may be required. By containing all of the channels within one SDR unit, timing information required to maintain coherency between antenna element channels may not require or can significantly reduce the extra circuits and equipment required.

In certain embodiments, software-defined radio (SDR) systems may further benefit from the RF antenna aggregator system 100 from its flexible signal processing capabilities. For example, the digital processor 111 may be programmed to process RF signals according to various communication protocols, making it possible to adapt the SDR system to new frequencies and standards without hardware changes. This flexibility may be important for military and emergency response applications, where communication systems must be adaptable to rapidly changing conditions and requirements.

In certain embodiments, the analog processor 113 may help the SDR system interface with the analog world. For example, it may allow the SDR system to receive and transmit analog signals of higher complexity communication methods employing spatial transmission and reception. These methods could include beamforming, multi-path exploitation, and supporting future high channel count algorithms which may be important for compatibility with existing and future radio equipment and for applications that require analog signal processing, such as signal intelligence and electronic warfare.

The converter 114 may enable the SDR system to perform analog-to-digital and digital-to-analog conversions. This capability may be crucial for SDR systems that need to process a broad spectrum of frequencies, allowing for the capture and generation of signals across a wide frequency range. The converter 114 may ensure the SDR system may manage high-bandwidth signals, which may be important for applications such as broadband for transmission and high-definition signal processing.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A radio frequency (RF) antenna aggregator system, comprising:
    an analog processor configured to separate a singular first RF signal into a plurality of first RF signals, and combine a plurality of second RF signals into a singular second RF signal using frequency division multiplexing;
    a digital processor configured to separate the singular second RF signal into the plurality of second RF signals, and combine the plurality of first RF signals into a singular first RF signal using frequency division multiplexing; and
    a converter in communication with the analog processor and the digital processor, the converter configured to convert the singular first RF signal and the singular second RF signal between digital and analog.

2. The RF antenna aggregator system of claim 1, wherein the plurality of first RF signals includes a digital input with individual signal bands separated.

3. The RF antenna aggregator system of claim 1, wherein the digital processor includes a digital combiner configured to combine the plurality of first RF signals using frequency domain multiplexing methods.

4. The RF antenna aggregator system of claim 1, wherein the converter is configured to convert the singular first RF signal from digital to analog.

5. The RF antenna aggregator system of claim 1, wherein the analog processor is configured to output the plurality of first RF signals in analog to a receiver.

6. The RF antenna aggregator system of claim 5, wherein the plurality of first RF signals in analog include a singular analog output with individual bands.

7. The RF antenna aggregator system of claim 5, wherein the receiver includes one of an amplifier, an antenna, and a switch.

8. The RF antenna aggregator system of claim 1, wherein the analog processor includes an analog power splitter configured to copy the singular first RF signal to the plurality of first RF signals.

9. The RF antenna aggregator system of claim 1, wherein the plurality of second RF signals includes a singular analog input with individual signal bands.

10. The RF antenna aggregator system of claim 9, wherein the analog processor is configured to receive the plurality of second RF signals in analog from a transmitter.

11. The RF antenna aggregator system of claim 10, wherein the transmitter includes one of an antenna and a block converter.

12. The RF antenna aggregator system of claim 1, wherein the analog processor includes an analog power combiner configured to combine the plurality of second RF signals using frequency division methods.

13. The RF antenna aggregator system of claim 1, wherein the converter is configured to convert the singular second RF signal from analog to digital.

14. The RF antenna aggregator system of claim 1, wherein the digital processor includes a digital separator configured to separate the plurality of second RF signals, using frequency division multiplexing methods.

15. The RF antenna aggregator system of claim 1, wherein the digital processor is configured to output the plurality of second RF signals in digital to a receiver, using frequency division multiplexing methods.

16. The RF antenna aggregator system of claim 1, wherein:
the plurality of first RF signals includes a digital input with individual signal bands separated,
the digital processor includes a digital combiner configured to combine the plurality of first RF signals,
the digital processor includes a digital separator configured to separate the plurality of second RF signals,
the digital processor is configured to output the plurality of second RF signals in digital to a receiver,
the converter is configured to convert the singular first RF signal from digital to analog,
the converter is configured to convert the singular second RF signal from analog to digital,
wherein the analog processor is configured to output the plurality of first RF signals in analog to a receiver, and includes an analog power splitter configured to demultiplex the singular first RF signal to the plurality of first RF signals, and the analog processor includes an analog power combiner configured to combine the plurality of second RF signals using frequency division methods, and
wherein the plurality of second RF signals includes a singular analog input with individual signal bands.

17. A method for transmitting a signal, comprising steps of:
providing an RF antenna aggregator system comprising;
a digital processor configured to combine a plurality of first RF signals into a singular first RF signal;
an analog processor configured to separate the singular first RF signal into the plurality of first RF signals; and
a converter in communication with the digital processor and the analog processor, the converter configured to convert the singular first RF signal from digital to analog;
receiving the plurality of first RF signals in digital form;
combining the plurality of first RF signals with the digital processor to form the singular first RF signal using frequency division multiplexing;
converting the singular first RF signal from digital to analog with the converter; and
splitting the singular first RF signal into the plurality of first RF signals with the analog processor to form the plurality of first RF signals in analog form, using frequency division multiplexing.

18. A method for receiving a signal, comprising steps of:
providing an RF antenna aggregator system comprising;
a digital processor configured to separate a singular second RF signal into a plurality of second RF signals;
an analog processor configured to combine a plurality of the second RF signals into the singular second RF signal; and
a converter in communication with the digital processor and the analog processor, the converter configured to convert the singular second RF signal from analog to digital;
receiving a plurality of second RF signals in analog form;
combining the plurality of second RF signals with the analog processor to form the singular second RF signal using frequency division multiplexing;
converting the singular second RF signal from analog to digital with the converter; and
splitting the singular second RF signal into the plurality of second RF signals with the digital processor to form the plurality of second RF signals in digital form using frequency division multiplexing.

* * * * *